United States Patent [19]

Forestieri et al.

[11] Patent Number: 5,299,174
[45] Date of Patent: Mar. 29, 1994

[54] AUTOMATIC CLUTTER ELIMINATION

[75] Inventors: Steven F. Forestieri, Santa Clara; Ray S. Spratt, San Jose, both of Calif.

[73] Assignee: Diasonics, Inc., Milpitas, Calif.

[21] Appl. No.: 9,279

[22] Filed: Jan. 26, 1993

Related U.S. Application Data

[63] Continuation-in-part of Ser. No. 867,038, Apr. 1, 1992, Pat. No. 5,228,009.

[51] Int. Cl.5 .............................................. G03B 42/06
[52] U.S. Cl. ...................................... 367/135; 367/7; 367/11; 367/901; 364/413.25; 128/661.09
[58] Field of Search ...................... 367/135, 7, 11, 901; 364/413.25; 128/661.09; 342/162

[56] References Cited

U.S. PATENT DOCUMENTS

| | | | |
|---|---|---|---|
| 3,869,601 | 3/1975 | Metcalf | 364/572 |
| 5,058,593 | 10/1991 | Forestieri et al. | 128/661.07 |
| 5,228,009 | 7/1993 | Forestieri et al. | 367/11 |

*Primary Examiner*—Daniel T. Pihulic

[57] ABSTRACT

An apparatus and method for clutter elimination from signals which digitizes a signal to generate n samples of the signals. M basis functions (such as various levels of filters) are fit to the n samples. An i+1 basis function of the m basis functions is iteratively subtracted from each of the n samples, and the difference is stored in an i difference signal until the i+1 difference signal is less than a threshold. In various embodiments, the threshold may be an absolute noise floor ($R_0^{min}$) preset by a manufacturer or a user. In other embodiments, the threshold may be based upon an absolute or relative predictor error of the signal once the basis function (filter) has been removed. The i difference signal may be used for performing a frequency estimate of the signal.

33 Claims, 2 Drawing Sheets

PEAK FLOW METHOD
200

AUTOMATIC CLUTTER ELIMINATION

This is a Continuation-in-Part of U.S. Ser. No. 07/867,038, filed Apr. 1, 1992, now U.S. Pat. No. 5,228,009, dated Jul. 13, 1993.

BACKGROUND OF THE INVENTION

1. Field of the Invention

The present invention relates to signal processing. More specifically, the present invention relates to a method for automatic clutter elimination which uses a variety of techniques for performing different levels of clutter elimination from different signals.

2. Background Information

In the signal processing art, it is typical that raw signals will be received in a form wherein a signal which is desired to be processed and noise (also known as clutter), are contained within the same raw signal. Typically, in these circumstances and in certain prior art systems, filtering has been performed upon the raw signal in order to remove the clutter. In certain prior art electronic implementations of signal processing devices, including those in use in ultrasonic color Doppler imaging, filters such as wall or high-pass filters have been used to remove low frequency information from the signal indicating stationary or very slow moving objects, such as those due to tissue or slow-moving blood flow. In these techniques, Discrete Fourier Transform (DFT), Infinite Impulse Response (IIR), and Finite Impulse Response (FIR) filters have been used to process the raw signal data into a form which may be used for various purposes, including color Doppler imaging. In another technique, clutter is removed from the signal using successively higher order basis functions (e.g., the Legendre functions) until the signal desired to be processed becomes apparent. This is described in the Applicants' previous application entitled "Parametric Clutter Elimination," filed on Apr. 10, 1992, assigned U.S. Ser. No. 07/867,038, now U.S. Pat. No. 5,228,009, which has been assigned to the assignee of the present invention.

In prior art systems, the same level of filtering or the same order of basis functions is removed for all signals which are being processed. For example, in the case of ultrasonic color Doppler imaging wherein the processed signals are displayed in various colors representing motion in the body, the same level of filtering (whether by prior art methods of filtering or Applicants' Parametric Clutter Elimination techniques and apparatus described in U.S. Pat. No. 5,228,009), the same level of filtering is applied for an entire group of signals (e.g., an entire frame in a region of interest). This approach, however, suffers from several defects.

In the case of color Doppler imaging wherein a set of signals from a region of interest (ROI) in a subject are used to form a video frame for display, higher levels of filtration may result in the distortion or elimination of signal data for areas in which there is slow moving blood flow by severely biasing the signal. For example, when viewing arterial and venous blood flow simultaneously in the same ROI, heavy filtering may be required for the arterial blood flow in order to remove clutter due to motion of the arterial wall. For arterial blood flow, using Applicants' U.S. Pat. No. 5,228,009, a linear or quadratic component may be desired to be removed from the raw signal data. For venous blood flow using this technique, in contrast, a mean may be desired to be removed from the raw signal. Thus, within a single region of interest in the case of ultrasonic examination, different levels of filtering are desirable for the various signals to generate the frame. Prior art methods limit the user to selecting one type of filtering which is performed upon all scans of each ROI. This poses substantial problems because signals representing venous blood flow may be severely biased to an undetectable level by the high level of filtering applied to the arterial blood flow. Thus, a fixed setting of the filter for an entire frame or ROI is undesirable.

Yet another defect of prior art signal processing methods and apparatus for removing clutter is that, typically, the level of filtration is controlled by the user via selection using a selector dial or similar input apparatus (e.g., icon selected on a display screen). For example, if the user requires a single level of filtering (e.g., removing a mean from the signal, as in Applicants' prior U.S. Pat. No. 5,228,009), then that level's filtering is applied entirely across the frame. As previously described, this is unsatisfactory. Moreover, user intervention is required to select the appropriate level of filtering. A technician being familiar with ultrasonic operating concepts thus may, depending upon operating circumstances, adjust the level of filtering to an appropriate level. However, an inexperienced technician may select an inappropriate filtering level. Thus, prior art methods of filtering signals, especially for use in ultrasonic imaging apparatus, suffers from several disadvantages.

SUMMARY AND OBJECTS OF THE INVENTION

One of the objects of the present invention is to provide an improved means for removing clutter from signal data.

Another of the objects of the present invention is to provide an improved means for removing clutter from input signals such as ultrasonic color Doppler data in an ultrasonic imaging system.

Yet another of the objects of the present invention is to provide a means for removing clutter from signals which adaptively change the type of filtering depending upon power levels of the signal at various stages of processing.

Yet another of the objects of the present invention is to provide an improved means for removing clutter from an input signal by specifying a noise floor to which the input signal will be filtered.

Yet another of the objects of the present invention is to provide an improved means for removing clutter from an input signal by using a prediction error power to control the iteration of the level of filters which should by applied.

Yet another of the objects of the present invention is to provide an improved means for filtering clutter from input signals without operator intervention.

These and other objects of the present invention are provided for by an apparatus and method for clutter elimination from signals which digitizes a signal to generate n samples of the signals. Then, m basis functions are fit to the n samples. An $i+1$ basis function of the m basis functions is iteratively subtracted from each of the n samples, and the difference is stored in an $i+1$ difference signal until the $i+1$ difference signal is less than a threshold. In various embodiments, the threshold may be an absolute noise floor ($R_0^{min}$) preset by a manufacturer or a user. In other embodiments, the threshold may be based upon an absolute or relative predictor error of the signal once the basis function or filter has been removed. Then, the i difference signal may be used for performing a frequency estimate of the signal.

BRIEF DESCRIPTION OF THE DRAWINGS

The present invention is illustrated by way of example and not limited by the figures of the accompanying in which like references indicate like elements and in which.

DETAILED DESCRIPTION

The present invention is an apparatus and method for signal processing, including processing ultrasonic data in an ultrasonic color Doppler imaging system. In the following description, numerous specific details are set forth such as specific hardware components, signals, etc., in order to provide a thorough understanding of the present invention. It will be obvious, however, to one skilled in the art that these specific details may not be required to practice the invention. In other instances, well-known components have not been described in detail in order to not unnecessarily obscure the present invention. In addition, it can be appreciated by one skilled in the art that the techniques applied to processing ultrasonic color Doppler imaging signal data discussed here may be equally applied to other fields of signal processing.

Figure 1:
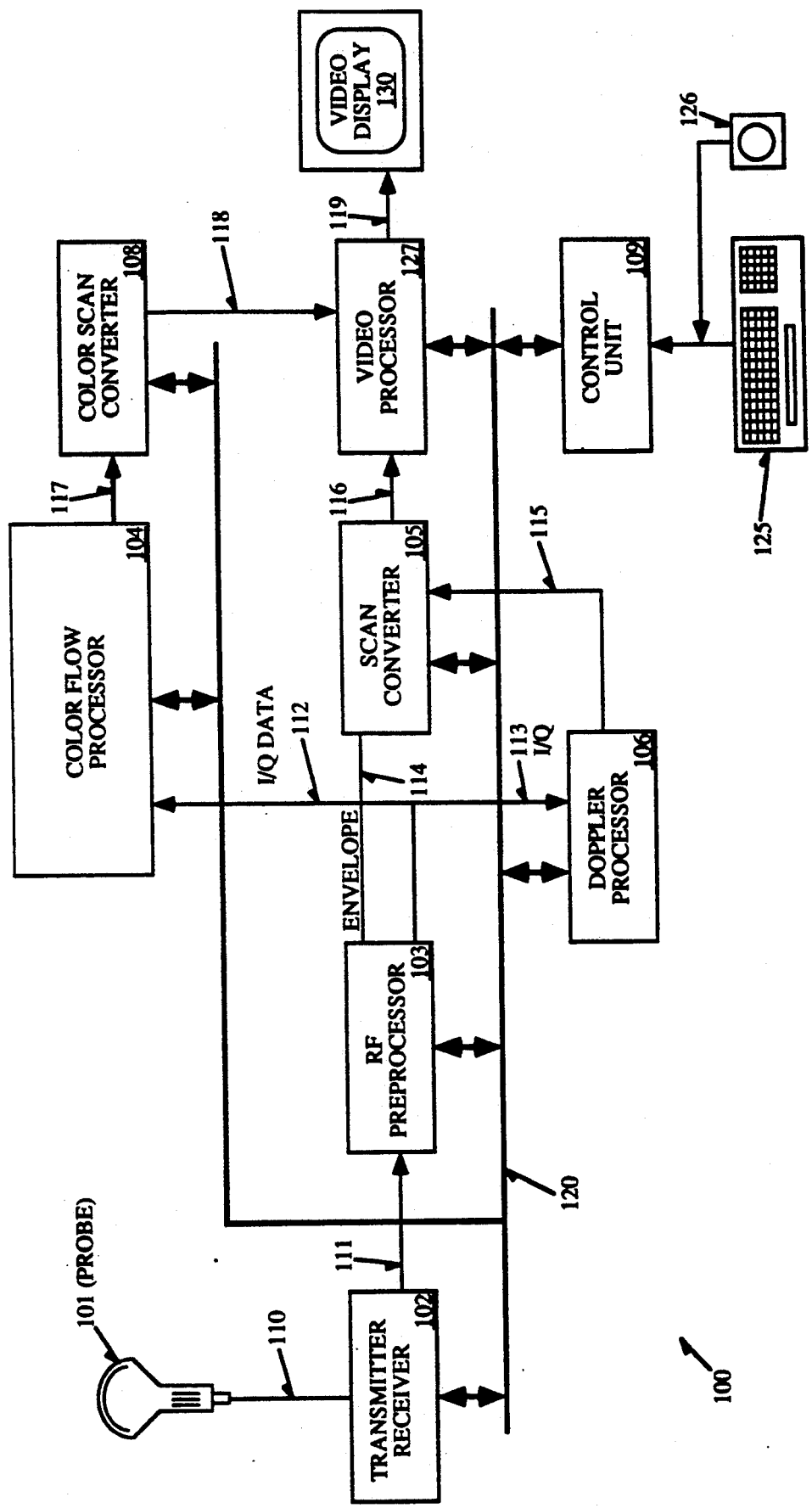
FIG. 1 shows a typical prior art ultrasonic imaging apparatus which provides for color Doppler flow imagery upon which the preferred embodiment of the present invention may be practiced.

The preferred embodiment resides in a system which has a color flow processor such as 104 shown in the apparatus in FIG. 1. This may include, for example, an apparatus such as that discussed in U.S. Pat. No. 5,058,593, which is assigned to the assignee of the present invention. The method and apparatus of the preferred embodiment may be implemented in discrete hardware components or, alternatively, in computers or digital signal processors using software which is loaded from disk-based storage and executed at run time. Programs containing the methods employing the preferred embodiment may also reside in firmware or similar non-volatile storage means.

The preferred embodiment provides a means for maintaining the fidelity of a signal in a digital signal processing environment while removing clutter. The technique processes a raw signal by filtering a signal (e.g., by removing a selected set of basis functions from the signal) in order to remove the portion of the raw signal representing clutter but yet maintain the fidelity of the signal.

A typical ultrasound system for color Doppler imaging and upon which the methods and apparatus of the preferred embodiment may be practiced is shown in FIG. 1 as imaging system 100. Imaging system 100 generally comprises a probe 101, which is typically a multi-element array of piezoelectric elements which both send and receive ultrasound signals when examining the human body. Probe 101 is coupled via signal path 110 to transmitter/receiver circuitry 102, which is designed according to principles well known in the ultrasound imaging art and for purposes of brevity will not be discussed in detail here.

Transmitter/receiver circuitry 102 is coupled to a control unit 109 via bus 120 and is controlled so that the elements in probe 101 are focusing at particular points in the body, both on transmit and receive. Transmitter/receiver circuitry 102 and control unit 109 also often provide a scanning function such that a two dimensional image may be generated without moving probe 101 with respect to the body.

Following transmission of ultrasound signals into the body, reflected signals are processed by the receiver function (which is typically known as a beamformer) in transmitter/receiver circuitry 102 and the multitude of signals from each individual element of probe 101 are converted into a single signal which is sent to RF (Radio Frequency) processor 103 via signal path 111.

RF processor 103, also under the control of control unit 109 via bus 120, processes the signal information to produce a detected and unipolar envelope signal and in-phase (I) and quadrature (Q) Doppler signals. The envelope signal represents the amplitude of echoes returning from the body and is further transmitted via signal path 114 to a scan converter 105 which is a typically a large electronic memory, also well known in the art.

Scan converter 105, also under the control of control unit 109 via bus 120, stores the envelope echo information on a line by line basis together with the geometrical position of such information in the body resulting from the scanning process, in such a manner that a two-dimensional video image may be constructed and transmitted to video processor 127 via signal path 116. Video processor 127 is also under the control of control unit 109 via bus 120.

In the absence of any color Doppler information, video processor simply sends a conventional video signal over signal path 119 to video display monitor 130. This two-dimensional image, usually black and white, represents the distribution of echo generating sites within the body. The so-called B-scan image is thus used by the operator to search the body for pathology or by the physician in developing a diagnosis.

I and Q signals for so-called single-gate Doppler are sent to Doppler processor 106 via signal path 113. Doppler processor 106, under the control of control unit 109 via bus 120, using signal processing methods well known in the art, compares signals from several successive echoes to determine the Doppler shift in a single region in the body which is commonly known as the sample volume. Doppler processor 106 also typically produces a continuous time series of spectral Doppler information in which blood flow velocities are displayed in black and white on video display 130 over one or more cardiac cycles (typically several seconds), having first been sent to scan converter 105 via signal path 115, to video processor 127 via signal path 116 and to video display 130 over signal path 119.

Finally, the third path to video display 130 is the color Doppler path in which the preferred embodiment may effect the signal, as discussed below.

RF processor 103 transmits I and Q signals via signal path 112 to color flow processor 104 which is also controlled by control unit 109 via bus 120. Color flow processor 104 typically processes several Doppler sample volumes along a given scanning direction in the body. Details of prior art color flow processing will be discussed below.

Color flow processor passes signals to color scan converter 108, also under the control of control unit 109 via bus 120, via signal path 117 where, in a manner similar to the black and white scan converter 105, color encoded signals are stored on a line by line basis, together with the geometrical position of such information in the body resulting from the scanning process, in such a manner that a two-dimensional color video image may be constructed and transmitted to video processor 127 via signal path 118.

Color scan converter 108, which may also be used to interpolate scan line information obtained from color flow processor 104, then transmits color Doppler information via signal path 118 to video processor 127 for display on video display 130. Video processor 127 typically includes so-called decision circuits to choose whether a given specific part of the two dimensional image has color information resulting from flow or whether it only has echo information from static tissue. If flow is present, the color information is displayed at the correct point in the image rather than the black and white image information.

This final composite two-dimensional color image showing blood flow in color overlaid on a black and white image represents the velocity of blood flow in vessels or organs and is used by the clinician to form a diagnosis of flow related pathology.

Control unit 109 is further coupled to a keyboard 125 for operator inputs and a mouse, trackball or other device 126 for movement and control of information shown on video display 130.

The methods and apparatus of the preferred embodiment reside in color flow processor 104 of the apparatus shown in FIG. 1. As was discussed in the previous patent, U.S. Ser. No. 07/867,038, now issued U.S. Pat. No. 5,228,009, in order to extract the signal representing blood flow from an input or raw signal, a successive series of basis functions may be used to process the input signal in order to remove clutter. In that patent, a selector dial or other input means allows the operator of the system to set the highest order basis function which is removed from the signal. As discussed in the background above, this may have certain defects, including filtering all color sample volumes (CSV's) in a region of interest (ROI) such that signals containing high levels of clutter (e.g., those due to arterial flow) are filtered at an equivalent level of signals having less clutter (e.g., those due to venous flow). Thus, this may cause severe biasing of the signals having less clutter, such as obscuring detectable blood flow. The preferred embodiment adaptively adjusts the level of filtering (or basis function) applied to each of the signals in a region of interest in ultrasound system 100 by assuming a noise floor beyond which the signal should not be filtered. In this manner, each signal is only processed to the extent that the remaining signal exceeds the noise floor. This will be graphically described with reference to the flowchart below, however, it is useful to briefly describe some of the terminology which will be used herein.

Peak Flow Techniques

The first embodiment of the present invention uses a peak flow technique to determine the level at which each signal should be filtered. Note that, for the remainder of this application, "filtering" will refer to both standard filtering techniques well-known in the prior art (e.g., DFT, IIR, or FIR) and also parametric modeling, such as that disclosed in U.S. applicants' Pat. Ser. No. 07/867,038, now U.S. Pat. No. 5,228,009. The purpose of this embodiment is to iteratively remove, using either prior art filtering or parametric techniques, portions of the signal while keeping the remaining signal above the noise floor. The noise floor may be specified by the user using a selector dial or other input device or may alternatively be set at the factory by the manufacturer. At any rate, a brief description of the process utilized will now be discussed.

As was discussed in Applicants' prior patent, the following quantities were defined:

$$R_0^0, R_0^1, R_0^2, \ldots$$

which are representative of the zeroth order lag products for each level of clutter elimination. $R_0^0$ is the value of $R_0$ after a mean has been removed, $R_0^1$ is the value of $R_0$ after a linear term has been removed, etc. Similarly, the values of the first order lag products are described as follows:

$$R_1^0, R_1^1, R_1^2, \ldots$$

In a system using Applicants' prior basis function removal technique, a pseudo programming language is used to describe the functioning of the preferred embodiment as follows:

```
for(i=0;i<maxorder;i++)
if(R0^(i+1)<R0^min)break;
order=i;
``` where $R_0^{min}$ is the operator or manufacturer-specified noise floor. This embodiment thus looks at the result to be gained from the additional level of filtering, and if it causes the signal to fall below specified set noise floor $R_0^{min}$, then the order of the filtering is not advanced. The last level of filtering performed is thus reversed. This may be done in a variety of ways, including, but not limited to, storing the previous level of filtering in a temporary variable and restoring the value of the signal to that value. This technique is done prior to performing a frequency estimate of the signal, for example, in a color Doppler imaging system. This first technique assumes a fixed noise floor $R_0^{min}$.

Unfortunately, this embodiment suffers from the disadvantage of being unable to react to changing noise conditions in the signal. Thus, when switching from one application to another which have different operating noise conditions, the use of a preset noise floor (e.g., by the manufacturer) in the system is unsatisfactory. Thus, this embodiment of the invention uses a selector dial or other input means, such as keyboard 125, to allow the user to define the noise floor. In this embodiment, if a minimum setting is set as the noise floor, then this is equivalent, in prior art systems, to providing maximum filtering for all signals. This may be unsatisfactory since it may result in severely biasing all signals. Thus, care should be taken when using various noise floors because it may defeat advantages of this embodiment.

Figure 2:
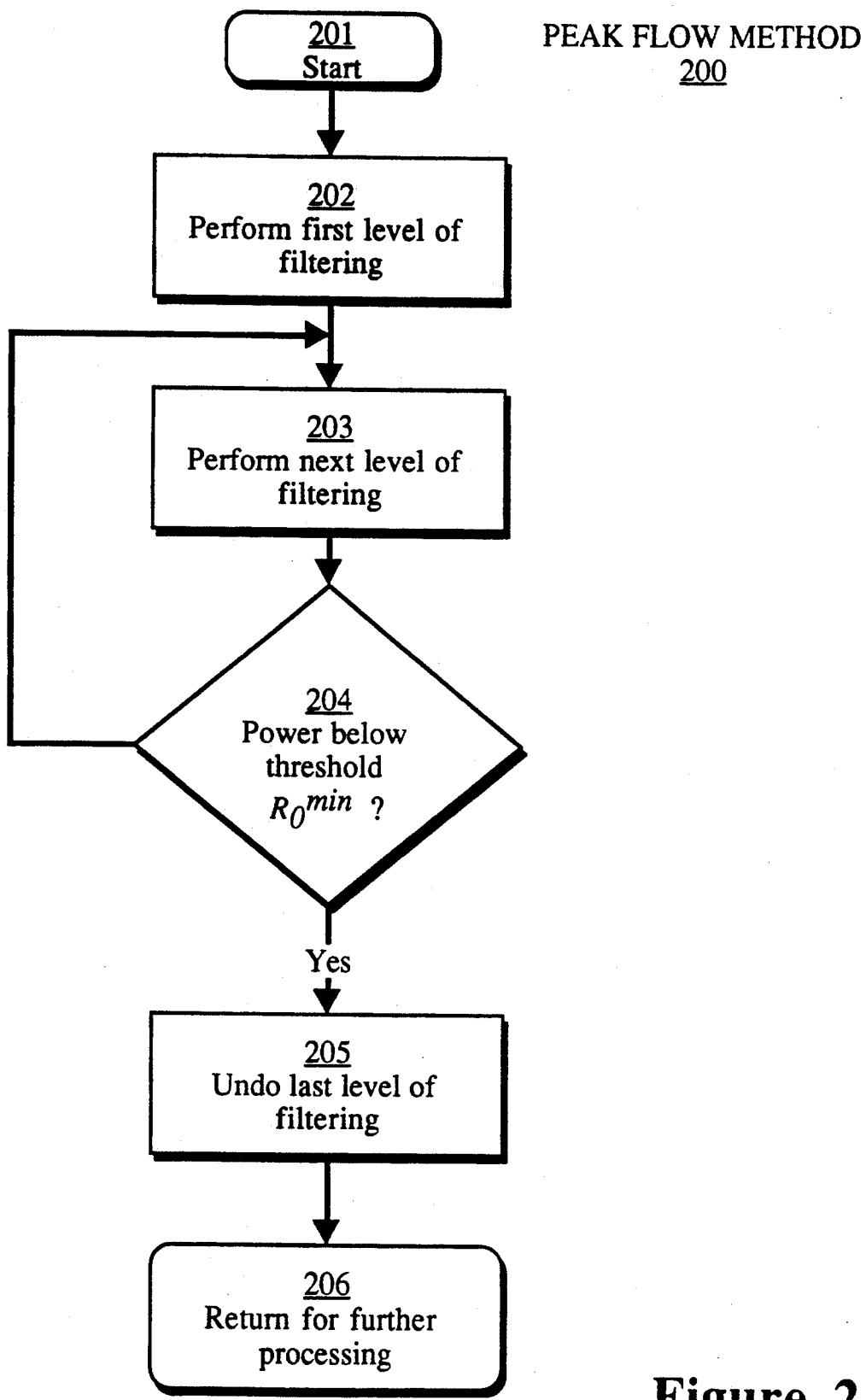
FIG. 2 shows a process flow diagram of a peak flow method for performing variable clutter removal upon input signals.

This embodiment of the present invention is illustrated by the process flow diagram 200 shown in FIG. 2. Process 200 starts at the process entry point, such as 201, wherein the process will be invoked, for example, upon the receipt of each color sample volume being examined in the subject. The preferred embodiment performs a first level of filtering at step 202. In applicants' prior patent U.S. Ser. No. 07/867,038, now U.S. Pat. No. 5,228,009, the first level of filtering (e.g., the removal of a mean from the signal) is always performed, as is illustrated in step 202. It can be appreciated by one skilled in the art, however, that with certain signal data which may require no preprocessing or filtering at all, this step may be omitted from a process which practices the present invention. At any rate, process 200 proceeds to step 203 which performs the next level of filtering. Using parametric elimination, for a first iteration of steps 203 and 204, this is equivalent to removing a linear term from the input signal. Process 200 then proceeds to step 204 which will determine whether the power of the signal due to the filtering performed at steps 202 and 203 above has reduced the signal to a power level below the noise floor $R_0^{min}$. If the power has not been reduced below the noise floor, then process 200 returns to step 203 to perform the next level of filtering upon the data. Steps 203 and 204 continue in an iterative fashion until the power of the signal has been reduced below the noise floor threshold $R_0^{min}$. Once the power of the signal has been reduced below the noise floor threshold $R_0^{min}$, then at step 205, the previous level of filtering performed upon the data is undone. This may be done in any number of ways, however, in order to reduce computational overhead in the preferred embodiment, the previous i iteration of filtering is stored in a temporary variable in order that the signal be restored to the previous value.

This embodiment requires that the calculations to remove each level of filtering be performed in order to determine whether the signal level has dropped below the noise floor $R_0^{min}$. It can be appreciated by one skilled in the art, however, that previous iterations from lower filtering levels may be saved for whatever purposes desired in order to reduce computational overhead (e.g., to "undo" previous iterations of filtering). Also, it can be appreciated by one skilled in the art that a step such as 205 may be performed by doing an arithmetic calculation of the current filtered signal and the quantity removed from the signal by the filter. In this manner, the previous unfiltered signal may be retrieved without storage of the previous unfiltered signal and thus will save storage space. Of course, this does not incur some computational overhead by adding the signal with the filter value removed. At any rate, once step 205 has been complete, the signal is at its optimum filtered value, and process 200 returns at step 206 for further processing of the signal such as performing a frequency estimate (e.g., to represent velocity of blood flow) of the signal in a color Doppler imaging system.

Process 200, described with reference to FIG. 2, suffers from one disadvantage, however. The main disadvantage of this technique, whether set by the operator or preset by the manufacturer, is the problem of tissue flash being generated on the ultrasonic display when nonflow wall components are highly filtered because of their large amplitude. Thus, large amplitude nonflow signal components, such as the movement of arterial or venous walls or other tissue artifacts may distort the resulting image. In addition, bleeding over vessel walls creates artifacts on the display, even when the automatic filtering method provided by FIG. 2 is implemented. Each of these problems has been addressed by a technique in which tissue flash has been tagged and blanked. Empirically, it has been found that the quantity $$\alpha = \frac{R_0^0}{R_0^1}$$

is very large in areas of tissue that produce tissue flash, and thus $\alpha$ can be used as the discrimination factor for blanking. Thus, when process 200 is active, the region may be checked for some value of $\alpha$ using the discrimination factor shown above in order to determine whether the region should be filtered in the normal manner. If the calculation for $\alpha$ exceeds some preset value, then the frequency estimate velocity may be tagged (e.g., to be set to zero), so no color assigned to the area on the display in color Doppler imaging systems. In this manner, a normal B-scan presentation of the region is performed in an ultrasound system and no frequency estimate is performed. Thus, the user of process 200 in conjunction with a discrimination check for the value $\alpha$ as computed and shown above will provide variable levels of filtration across an entire region of interest or for individual signals. This also avoids the artifacts caused by tissue flash and bleeding over vessel walls, for example, in ultrasonic color Doppler imaging systems.

Prediction Error Techniques

In another embodiment, a process may use a predictor error of the signal to determine at what level to filter the signal. Using applicants' prior patent U.S. Ser. No. 07/867,038, now U.S. Pat. No. 5,228,009, this embodiment will determine how appropriate the parametric model is for each sample volume to determine which filter level should be used. This method uses both an absolute predictor error and a relative predictor error to determine whether the next level of filtering may be used to perform the frequency estimate.

In this embodiment, the absolute predictor error is determined, which is calculated as follows:

$$p_e^i = R_0^i(1 - c_0^i)$$

where:

$$c_0^i = \frac{|R_1^i|}{R_0^i}$$

In other words, the quantity $P_e^i$ indicates the remaining power after the clutter and the frequency estimate has been removed from the total signal. This indicates how good a "fit" the single pole model is. A pseudo programming language representation of the method steps taken is shown as follows:

for(i=0;i<maxorder;i++)
  if($\alpha p_e^{i+1} > p_e^i$) break;
  order=i;

wherein, in this embodiment, $\alpha$ ranges from 1.0 to 5.0. In other words, the filter order is not advanced unless a sufficient percentage of the remaining error power is removed. This technique has the advantage of not overfiltering tissue and not relying upon arbitrary absolute noise floor estimates, as was discussed with reference to the peak flow techniques discussed above. Thus, a process which implements this technique, illustrated by pseudo programming language code segment representation, will be virtually equivalent to that shown in process 200 of FIG. 2, however, step 204, instead of testing whether the power of the signal has become less than some threshold, will instead test whether the absolute prediction error of the signal has been sufficiently reduced. If not, then no additional filtering is performed, and the previous level of filtering is restored at step 205. Thus, the only change is to decision step 204 in process 200. The filter order is not advanced unless a sufficient percentage of the remaining error power is removed. This technique has the advantage of not over-filtering tissue and not relying upon arbitrary noise floor estimates.

In yet another alternative embodiment, instead of determining whether the absolute error has decreased in the signal, it is determined whether the relative predictor error has decreased enough in order to advance the filter one additional level. The relative predictor error is defined as follows:

$$p_e^i = 1 - c_0^i$$

Again, it is determined whether the relative predictor has decreased enough, and process 200 would use this measurement for the predictor error instead that discussed above.

Using either the relative or absolute predictor errors, the value $\alpha$ is required to be set at some point. This may be either set by the manufacturer or set by the operator. It is desired that operator intervention be kept to a minimum, however, in some circumstances, it may be important for control over some of these parameters be provided. In any event, all of these embodiments described herein provide substantial improvements over the prior art methods of processing signals in order to remove clutter which use predetermined filtering levels for a variety of signals.

Thus, an invention for automatic clutter elimination from signals has been described. Although the present invention has been described particularly with reference to FIGS. 1 and 2, specific signals, processes, color Doppler imaging, etc., it may be appreciated by one skilled in the art that departures and modifications may be made by one of ordinary skill in the art without departing from the general spirit and scope of the present invention.

What is claimed is:

1. A method for automatic clutter elimination from signals comprising the following steps:
   a. digitizing a signal to generate n samples;
   b. fitting m basis functions to said n samples;
   c. iteratively subtracting an $i+1$ basis function of each of said m basis functions from said n samples and storing the difference in an $i+1$ difference signal until said $i+1$ difference signal is less than a threshold; and
   d. using said i difference signal for performing a frequency estimate of said signal.

2. The method of claim 1 wherein said threshold comprises a user-settable threshold.

3. The method of claim 1 wherein said threshold comprises a minimum noise value.

4. The method of claim 1 wherein said threshold comprises a prediction value.

5. The method of claim 4 wherein said prediction value comprises a relative prediction value.

6. The method of claim 4 wherein said prediction value comprises an absolute prediction value.

7. A method for automatic clutter elimination from signals comprising the following steps:
   a. digitizing a signal to generate n samples;
   b. determining m filtering functions to remove clutter from said n samples, each $i+1$ filtering function of said m filtering functions removing additional clutter from said n samples than an i filtering function;
   c. iteratively subtracting an $i+1$ filtering function of each of said m filtering functions from said n samples and storing the difference in an i difference signal until said $i+1$ difference signal is less than a threshold; and
   d. using said i difference signal for performing a frequency estimate of said signal.

8. The method of claim 7 wherein said signal is a ultrasonic echo signal of a color sample volume in a subject under examination.

9. The method of claim 7 which is repeated for each signal in a portion of a subject under examination.

10. The method of claim 7 wherein said steps are repeated for each signal of an area under examination in a subject to generate a plurality of pixels for a frame.

11. A method of clutter elimination from signals comprising the following steps:
    a. digitizing a plurality of signals to generate n samples of each of said plurality of signals;
    b. for each of said plurality of signals, determining m filtering functions to remove clutter from said n samples of each of said plurality of signals, each of said m filtering functions removing additional clutter from said n samples;
    c. for each said plurality of signals, iteratively subtracting an $i+1$ filtering function of each of said m filtering functions from said n samples and storing the difference in an i difference signal until said $i+1$ difference signal is less than a threshold; and
    d. for each of said plurality of signals, using said i difference signal for performing a frequency estimate of said signal.

12. The method of claim 11 wherein said plurality of signals comprises ultrasonic echo reflections from a region in a subject under examination.

13. The method of claim 12 wherein said plurality of signals comprise color sample volumes (CSV's) in said subject under examination.

14. The method of claim 11 wherein said threshold comprises a user-settable threshold.

15. The method of claim 11 wherein said threshold comprises a minimum noise value.

16. The method of claim 11 wherein said threshold comprises a prediction value.

17. The method of claim 16 wherein said prediction value comprises a relative prediction value.

18. The method of claim 16 wherein said prediction value comprises an absolute prediction value.

19. An apparatus for filtering signals comprising:
    a. means for digitizing a plurality of signals to generate n samples of each of said plurality of signals;
    b. means for determining from each of said plurality of signals, m filtering functions to remove clutter from said n samples of each of said plurality of signals, each of said m filtering functions removing additional clutter from said n samples;
    c. means for iteratively subtracting an $i+1$ filtering function of each of said m filtering functions from said n samples for each of said plurality of signals, and storing the difference in an $i+1$ difference signal until said $i+1$ difference signal is less than a threshold; and
    d. means for using said i difference signal for performing a frequency estimate of each of said plurality of signals.

20. A method of clutter elimination from signals comprising the following steps:
    a. digitizing a signal to generate a digitized of said signal;

b. determining m filtering functions to remove clutter from said digitized signal, each of said m filtering functions removing additional clutter from said digitized signal;

c. iteratively subtracting an i+1 filtering function of each of said m filtering functions from said digitized signal and storing the difference in an i+1 difference signal until said i+1 difference signal is less than a threshold; and d. using said i difference signal for performing a frequency estimate of said digitized signal.

21. A method of clutter elimination from a signal comprising the following steps:

a. determining m filtering functions to remove clutter from said signal, each of said m filtering functions removing additional clutter from said signal than a previous m filtering function;

b. iteratively subtracting an i+1 filtering function of each of said m filtering functions from said signal to generate a difference and storing said difference in an i+1 difference signal until said i+1 difference signal is less than a threshold; and c. using said i difference signal.

22. The method of claim 21 wherein said signal comprises a zero order lag product $R_0$.

23. The method of claim 22 wherein said difference signal comprises $R_0^i$.

24. The method of claim 23 wherein said threshold comprises $R_0^{min}$.

25. The method of claim 24 further comprising the step of determining whether a discrimination factor $\alpha$ is greater than $$\frac{R_0^0}{R_0^1}$$

and if so, then setting said signal to zero and terminating.

26. The method of claim 23 wherein said signal comprises a first order lag product $R_1$.

27. The method of claim 23 wherein said step of determining whether said i difference signal is less than a threshold comprises determining whether an absolute predictor error $\alpha p_e^{i+1}$ is greater than $p_e^i$ wherein $p_e^i = R_0^i(1-c_0^i)$ and $$c_0^i = \frac{|R_1^i|}{R_0^i}.$$

28. The method of claim 23 wherein said step of determining whether said i difference signal is less than a threshold comprises determining whether a relative predicator error $\alpha p_e^{i+1}$ is less than $\alpha p_e^i$ wherein $p_e^i = 1 - c_0^i$ and $$c_0^i = \frac{|R_1^i|}{R_0^i}.$$

29. The method of claim 21 wherein said step of using said i difference signal comprises performing a frequency estimate of said i signal.

30. A method of clutter elimination from a signal $R_0$ comprising the following steps:

a. iteratively determining a filtered signal $R_0^{i+1}$ of said signal $R_0$ until said filtered signal $R_0^{i+1}$ is less than a threshold $R_0^{min}$; and b. using said $R_0^i$ difference signal.

31. The method of claim 30 further comprising the step of determining whether a discrimination factor $\alpha$ is greater than $$\frac{R_0^0}{R_0^1}$$

and if so, then setting said filtered signal $R_0^i$ to zero and terminating.

32. A method of clutter elimination from a signal comprising lag products $R_0$ and $R_1$ comprising the following steps:

a. iteratively determining a filtered signal comprising $R_0^i$ and $R_1^i$ of said signal until an absolute predictor error $\alpha p_e^{i+1}$ of said filtered signal is greater than $p_e^i$ wherein $p_e^i = R_0^i(1-c_0^i)$ and $$c_0^i = \frac{|R_1^i|}{R_0^i} \text{; and}$$

b. using said i filtered difference signal.

33. A method of clutter elimination from a signal comprising lag products $R_0$ and $R_1$ comprising the following steps:

a. iteratively determining a filtered signal $R_0^i$ and $R_1^i$ of said signal until a relative predictor error $\alpha p_e^{i+1}$ of said filtered signal is greater than $p_e^i$ wherein $p_e^i = 1 - c_0^i$ and $$c_0^i = \frac{|R_1^i|}{R_0^i} \text{; and}$$

b. using said i filtered difference signal.

* * * * *